Patented Nov. 5, 1929

1,734,291

UNITED STATES PATENT OFFICE

ERICH GEBAUER-FUELNEGG, OF VIENNA, AUSTRIA, ASSIGNOR TO E. I. DU PONT DE NEMOURS & COMPANY, OF WILMINGTON, DELAWARE, A CORPORATION OF DELAWARE

CELLULOSE CONDENSATION PRODUCT AND PROCESS FOR MAKING SAME

No Drawing.  Application filed August 19, 1927. Serial No. 214,216.

This invention relates to sulfonic acid derivative-cellulose condensation products and methods for preparing the same.

The steadily increasing technical demand for cellulose esters, which find numerous applications in the various arts, has resulted in the production of a large number and variety of compounds of cellulose esterified with the radicals of strong as well as weak inorganic and organic acids. So-called cellulose sulfuric acid esters have been prepared and described in the literature, but every indication points to the fact that these substances, are esters of a much degraded cellulose, such as a polysaccharide. This view is supported by the fact that solutions of such esters exhibit strong optical polarization, and also by the fact that these esters form water-soluble barium salts.

It is one of the objects of the present invention to form condensation products of cellulose and sulfonic acid derivatives which will be described as the sulfonic acid esters or undegraded sulfonic acid esters of cellulose. It is a further object of the invention to prepare compounds such as those mentioned, which have valuable properties not possessed by the substances heretofore known.

The present invention comprises sulfonic acid derivative-cellulose condensation products which are prepared by treating cellulose with a reaction mixture containing a tertiary amine and a substance which contains the following radical:—

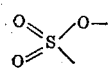

The following is a specific example of the invention which is given merely by way of illustration and not in limitation:

232 parts of chlorsulfonic acid are mixed with 548 parts of pyridine by adding the acid drop by drop to the pyridine which is ice cold. 50 parts of air-dry cellulose is treated with the mixture just described, the treatment being carried out at a temperature of about 100° C. until the fibrous structure of the cellulose disappears. Under these conditions, the reaction reaches completeness in about 75 minutes. The resulting viscous mass is poured into water and may be separated from this solution by one of the following methods:

1. By adding to the solution an excess of alcohol or acetone; the separation being hastened, if desired, by centrifuging;
2. By treating the solution with alcohol saturated with sodium chloride;
3. By treating the solution by adding alcohol until the solution becomes turbid and precipitating the ester by the addition of a small amount of saturated sodium chloride solution.

Other solutions may be used for the precipitation—as is well known from colloid chemistry—provided that the salts do not react with the ester to form insoluble salts of the ester.

In place of the chlorsulfonic acid described above the esters of chlorsulfonic acid may be used in the same molecular proportions (e. g. the ethyl ester, etc.), the reaction with this material going more slowly, but after about six hours the reaction is complete and the product is practically identical with that formed in the example described. It has been found that, in general, substances containing the following radical:—

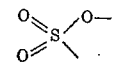

are suitable for use in preparing the esters of this invention.

In place of pyridine, it has been found that tertiary amines (e. g. dimethyl aniline), are generally suitable for use in this process, the prime prerequisite seeming to be that the amine form an easily dissociated salt with chlorsulfonic acid or equivalent substances.

The esterification reactions may be conducted at any suitable temperature, but it has been found that by working at temperatures in the neighborhood of 100° C. the reaction is carried to completion more rapidly and more satisfactorily. Somewhat higher temperatures may be used if desired, and if time is not a vital factor in the process such lower temperature may be used as may be found satisfactory.

The product obtained in the above example is probably a pyridine salt of the sulfonic acid ester obtained from cellulose, since on the addition of alkalies, pyridine is given off. The ester may be obtained from the pyridine or other salts of the ester by treating the salts with a weak acid. The salts of the ester, i. e. the pyridine salt of the ester, are characterized by double decomposition taking place with certain salts, with formation of practically insoluble metallic salts of the esters. Such insoluble salts are formed by treatment with soluble salts of aluminum, barium, calcium and lead. For instance a barium salt of the ester prepared in this manner is practically insoluble in water and is not appreciably altered even in boiling water; it is also very resistant to diluted strong acids in the cold, and barium hydroxide solutions do not alter it materially even after boiling for several hours. It is possible to take advantage of this property of the pyridine and like salts of the ester by forcing the salt through a spinneret into a precipitating bath of the soluble barium salt, for example barium nitrate. In this manner it is possible to obtain threads of the precipitated barium salt of the ester.

As has been pointed out the esters or the amino salts thereof are soluble in water in the sense that they form a reversible colloidal solution, which in concentrated solution is viscous. When the solutions are dried on a suitable surface, films are formed which may be obtained in practically any desired thickness and size. The films are soluble in water but are insoluble in most organic solvents. The esters are further characterized by showing no optical rotation when a water solution of the ester is tested.

While the condensation products of cellulose and sulfuric or sulfonic acid are spoken of as esters, it is not desired to limit this invention to any set chemical formulas or definitions since, while the products are most probably esters of the type mentioned and display ester characteristics, the final composition of the products is not definitely known.

Suitable variations and changes may be introduced into the mattters herein set forth, without departing from the spirit and scope of the present invention, except as set forth in the appended claims.

I claim:

1. The process for preparing sulfonic acid-derivative-cellulose condensation products which comprises treating cellulose with a reaction mixture containing a tertiary amine and a substance which contains the radical:—

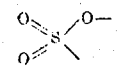

said substance being capable of sulfonating the cellulose.

2. The process for preparing sulfonic acid-derivative-cellulose condensation products which comprises treating cellulose with a reaction mixture containing a tertiary amine and a chlorsulfonic acid.

3. The process for preparing sulfonic acid-derivative-cellulose condensation products which comprises treating cellulose with a reaction mixture containing pyridine and a chlorsulfonic acid.

4. The process for preparing sulfonic acid-derivative-cellulose condensation products which comprises treating cellulose with a reaction mixture containing a tertiary amine and ethyl chlorsulfonic acid.

5. The process for preparing sulfonic acid-derivative-cellulose condensation products which comprises treating cellulose with a reaction mixture containing pyridine and ethyl chlorsulfonic acid.

6. The process for preparing sulfonic acid-derivative-cellulose condensation products which comprises treating cellulose with a reaction mixture containing a tertiary amine and a substance which contains the radical:—

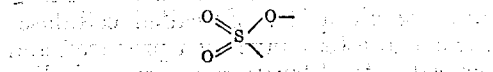

said substance being capable of sulfonating the cellulose, and separating the condensation products from solution by precipitating out.

7. The process for preparing undegraded sulfuric acid esters which comprises treating cellulose with a reaction mixture containing a tertiary amine and a member of the group which consists of chlorsulfonic acid and its esters.

8. A sulfonic acid-derivative-cellulose condensation product characterized by the fact that its barium salt is substantially insoluble in water and organic solvents.

9. A chlorsulfonic acid-cellulose condensation product characterized by the fact that its barium salt is substantially insoluble in water and organic solvents.

In testimony whereof I affix my signature.

ERICH GEBAUER-FUELNEGG.

CERTIFICATE OF CORRECTION.

Patent No. 1,734,291.                          Granted November 5, 1929, to

ERICH GEBAUER-FUELNEGG.

It is hereby certified that error appears in the printed specification of the above numbered patent requiring correction as follows: Page 1, line 24, for the word "sulfonic" read "sulfuric"; and that the said Letters Patent should be read with this correction therein that the same may conform to the record of the case in the Patent Office.

Signed and sealed this 3rd day of December, A. D. 1929.

(Seal)
                                                            M. J. Moore,
                                           Acting Commissioner of Patents.